(12) United States Patent
Ito

(10) Patent No.: US 9,723,166 B2
(45) Date of Patent: Aug. 1, 2017

(54) IMAGE FORMING SYSTEM

(71) Applicant: BROTHER KOGYO KABUSHIKI KAISHA, Nagoya-shi, Aichi-ken (JP)

(72) Inventor: Masafumi Ito, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/061,401

(22) Filed: Mar. 4, 2016

(65) Prior Publication Data

US 2016/0261762 A1 Sep. 8, 2016

(30) Foreign Application Priority Data

Mar. 6, 2015 (JP) ................ 2015-044441

(51) Int. Cl.
*H04N 1/04* (2006.01)
*H04N 1/00* (2006.01)

(52) U.S. Cl.
CPC ....... *H04N 1/00891* (2013.01); *H04N 1/0032* (2013.01); *H04N 1/0083* (2013.01); *H04N 1/00899* (2013.01); *H04N 2201/0094* (2013.01)

(58) Field of Classification Search
CPC ..... H04N 2201/0093; H04N 2201/044; H04N 5/3575; H04N 5/3698; H04N 5/3742; H04N 5/3745; H04N 5/378; H04N 9/30; G06F 1/3203; G06F 1/3212; G06F 3/038; G06F 3/041; G06F 3/0483; G06F 1/263
USPC ................ 358/1.13, 1.14, 1.15, 1.5
See application file for complete search history.

(56) References Cited

U.S. PATENT DOCUMENTS

| | | | | | |
|---|---|---|---|---|---|
| 5,946,457 | A | * | 8/1999 | Nakai | ................ H04N 1/00127 358/1.13 |
| 6,542,705 | B2 | * | 4/2003 | Fujita | ................ G03G 15/2003 219/216 |
| 7,460,263 | B2 | * | 12/2008 | Maeda | ................ G06F 3/1221 358/1.13 |
| 8,203,729 | B2 | * | 6/2012 | Miyake | ............. G03G 15/5004 358/1.14 |

(Continued)

FOREIGN PATENT DOCUMENTS

| | | |
|---|---|---|
| JP | 2003-015478 A | 1/2003 |
| JP | 2006-035751 A | 2/2006 |
| JP | 2007-248729 A | 9/2007 |

Primary Examiner — Negussie Worku
(74) Attorney, Agent, or Firm — Merchant & Gould P.C.

(57) ABSTRACT

An image forming system includes an image forming apparatus. The image forming apparatus includes an image forming unit, a housing, an apparatus controller, and an apparatus power supply. The apparatus power supply is configured to generate a control voltage that is supplied to the apparatus controller and an apparatus drive voltage that is supplied to the image forming unit, the apparatus power supply including an output terminal from which the control voltage is outputted. The image forming apparatus includes a first connection terminal, and a second connection terminal. The apparatus controller is configured to transmit a change command via the second connection terminal and change an operation status of the apparatus power supply after the apparatus controller receives information in response to the change command. The image forming system can also include an option device connected to the first and second connection terminals.

14 Claims, 10 Drawing Sheets

(56) References Cited

U.S. PATENT DOCUMENTS

| | | | |
|---|---|---|---|
| 9,272,509 B2* | 3/2016 | Suzuki | B41J 2/04543 |
| 2006/0023245 A1 | 2/2006 | Sato et al. | |
| 2007/0212102 A1* | 9/2007 | Yano | G03G 15/5004 |
| | | | 399/88 |
| 2008/0055635 A1* | 3/2008 | Takahashi | B41J 11/485 |
| | | | 358/1.15 |
| 2008/0229132 A1* | 9/2008 | Suga | B41J 29/38 |
| | | | 713/324 |
| 2008/0304842 A1* | 12/2008 | Tomiie | G03G 15/0266 |
| | | | 399/50 |
| 2008/0304852 A1* | 12/2008 | Kishi | G03G 15/2039 |
| | | | 399/88 |
| 2009/0009803 A1* | 1/2009 | Takeuchi | H04N 1/00408 |
| | | | 358/1.15 |
| 2009/0040541 A1* | 2/2009 | Maeda | B41J 3/407 |
| | | | 358/1.9 |
| 2012/0177391 A1* | 7/2012 | Lee | G03G 15/161 |
| | | | 399/66 |
| 2013/0058671 A1* | 3/2013 | Miyoshi | G03G 15/1675 |
| | | | 399/66 |
| 2014/0079421 A1* | 3/2014 | Takeuchi | G03G 15/1605 |
| | | | 399/66 |
| 2014/0176978 A1* | 6/2014 | Shigetomi | H02M 3/156 |
| | | | 358/1.13 |
| 2015/0002885 A1* | 1/2015 | Takahashi | G03G 15/5004 |
| | | | 358/1.14 |
| 2015/0055972 A1* | 2/2015 | Kosaka | G03G 15/80 |
| | | | 399/88 |
| 2015/0146622 A1* | 5/2015 | Ren | H04L 5/005 |
| | | | 370/328 |

* cited by examiner

IMAGE FORMING SYSTEM

CROSS-REFERENCE TO RELATED APPLICATION

This application claims priority from Japanese Patent Application No. 2015-044441 filed on Mar. 6, 2015, the content of which is incorporated herein by reference in its entirety.

FIELD OF DISCLOSURE

The disclosure relates to a power supply control technique for an option device in an image forming system including an image forming apparatus and the option device.

BACKGROUND

A known image forming system includes an image forming apparatus and an option device connected to the image forming apparatus. For example, an image forming apparatus of an image forming system is connected to option devices, e.g., a plurality of sheet supply devices configured to supply sheets to the image forming apparatus and a plurality of post-processing devices configured to perform processing for sheets having images formed thereon by the image forming apparatus, e.g., binding and fastening using staples. Each of the sheet supply devices and the post-processing devices includes a power supply unit configured to be connected to a commercial power supply. Power is supplied to control circuits of the sheet supply devices and the post-processing devices from the power supply units. A drive circuit of a sheet supply device is configured to drive a motor and a solenoid with power supplied from a power supply unit.

The image forming apparatus is configured to transmit a control signal for turning power on and off, for example, to a sheet supply device, via a communication interface. A control circuit of the sheet supply device determines a content of a received control signal, and starts or stops power supply from the power supply unit of the sheet supply device to its drive circuit in response to the control content.

SUMMARY

In the image forming system, the control circuit of the sheet supply device receives a control signal from the image forming apparatus and starts up (e.g., activates) or stops (e.g., deactivates) the drive circuit in association with operations of the image forming apparatus. To receive a control signal that will be transmitted from the image forming apparatus at any time, the control circuit needs to always monitor a control signal to be input via the communication interface. In other words, power needs to be continuously supplied from the power supply unit to the control circuit, to always keep the control circuit activated or operated. This may increase power consumption.

One or more aspects of the disclosure is to provide an image forming system that includes an image forming apparatus and an option device and may achieve power-saving.

The image forming system according to the disclosure may achieve power-saving.

DETAILED DESCRIPTION

Figure 1:
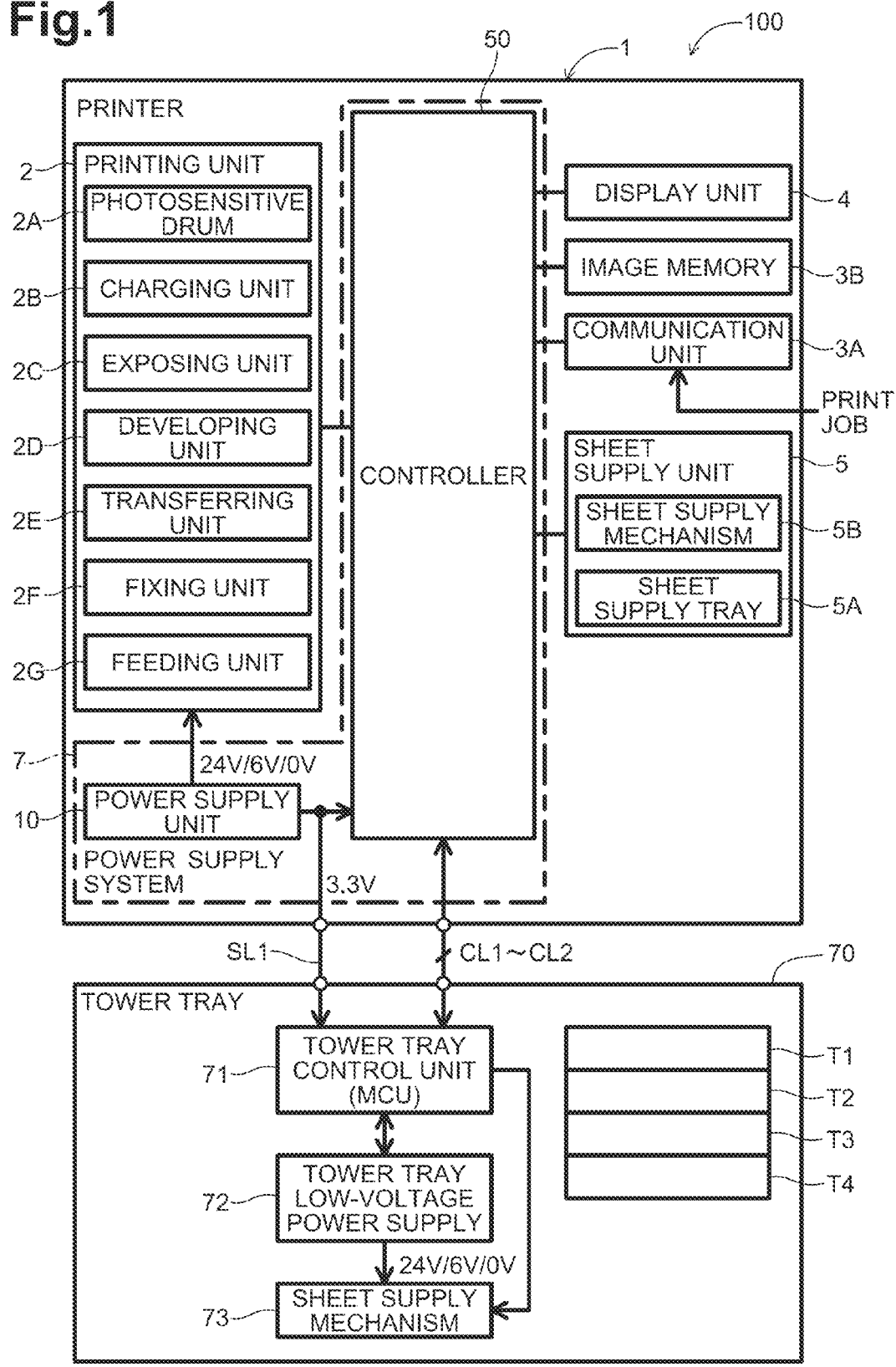
FIG. 1 is a block diagram illustrating configuration of a printer system according to an illustrative embodiment.

Illustrative embodiments will be described referring to the accompanying drawings. FIG. 1 depicts a configuration of an image forming system, e.g., a printer system 100, according to an illustrative embodiment. As depicted in FIG. 1, the printer system 100 includes a printer 1 and a tower tray 70. The printer 1 is an example of an image forming apparatus. The tower tray 70 is an example of an option device. The image forming apparatus is not limited to a printer but may be, for example, a copier, a scanner, or a multi-functional device.

The printer 1 is connected to the tower tray 70 via a power supply line SL1 and a plurality of communication lines CL1 and CL2. The power supply line SL1 connects a voltage output terminal provided in the printer 1 and a voltage input terminal provided in the tower tray 70. Each communication line CL1 and CL2 connects a communication terminal provided in the printer 1 and a communication terminal provided in the tower tray 70.

The printer 1 includes an image forming unit, e.g., a printing unit 2, a communication unit 3A, an image memory 3B, a display unit 4, a sheet supply unit 5, and a power supply system 7. The power supply system 7 includes a power supply unit 10 and a controller 50. The power supply unit 10 functions as a power supply of the printer 1. The power supply unit 10 according to the illustrative embodiment also functions as a power supply of a tower tray control unit 71 of the tower tray 70.

The printing unit 2 includes a photosensitive drum 2A, a charging unit 2B configured to charge a surface of the photosensitive drum 2A, an exposing unit 2C configured to form an electrostatic latent image on the surface of the photosensitive drum 2A, a developing unit 2D configured to form a developer image by applying developer to the electrostatic latent image formed on the surface of the photosensitive drum 2A, a transferring unit 2E configured to transfer the developer image onto a sheet (e.g., a paper sheet and an overhead projector ("OHP") sheet), a fixing unit 2F configured to thermally fix the developer image transferred on a sheet with heat from a heater, and a feeding unit 2G configured to feed a sheet. The printing unit 2 is configured to print an image onto a sheet based on print data by driving, for example, the photosensitive drum 2A.

The communication unit 3A is configured to perform communication with an external information terminal (e.g. a personal computer) connected via a network. The communication unit 3A is configured to receive a print job from an external information terminal. The image memory 3B is configured to temporarily store print data included in a print job received from an information terminal. The display unit 4 includes, for example, a capacitive touch panel and a liquid crystal display panel, which are superposed on each other in a thickness direction of the display unit 4. This construction allows various input operations to be performed by touching or pressing an operation key displayed on the touch panel. The sheet supply unit 5 includes a sheet supply tray 5A and a sheet supply mechanism 5B. The sheet supply tray 5A is configured to store sheets to be used for printing. The sheet supply mechanism 5B includes a pickup roller and a sheet supply roller and is configured to supply a sheet to the feeding unit 2G. The feeding unit 2G includes a motor, a gear, a solenoid, a feeding roller, and a belt and is configured to feed a sheet supplied from the sheet supply unit 5 to the components or units of the printing unit 2.

The printer 1 is configured to control the controller 50 to process a print job, for example, as the communication unit 3A receives the print job from an information terminal. The controller 50 is configured to control the components or units of the printing unit 2 to execute printing processing, to print an image based on print data, onto a sheet.

The power supply system 7 is configured to supply drive voltages to, for example, the printing unit 2, the communication unit 3A, and the controller 50. A drive voltage of the fixing unit 2F and the feeding unit 2G of the printing unit 2, and the sheet supply unit 5 is, for example, 24 V. A drive voltage of the controller 50, the communication unit 3A, and the image memory 3B is, for example, 3.3 V.

The printer 1 has a normal mode, e.g., a ready mode and a print mode, a first sleep mode, e.g., a sleep mode, a second sleep mode, e.g., a deep sleep mode, and an off mode. In the ready mode, the printer 1 is placed in a state in which printing processing may be performed immediately in response to a print job. Therefore, in the ready mode, the power supply system 7 is operating. Energization of the fixing unit 2F, more specifically, a heater of the fixing unit 2F, is controlled by the controller 50 so that the fixing unit 2F may be maintained at a temperature at which fixing is possible or a temperature slightly lower than the temperature at which fixing is possible. In the print mode, the printing unit 2 is operating and printing processing is performed and energization of the heater of the fixing unit 2F is controlled by the controller 50 so that the fixing unit 2F may be maintained at a temperature at which fixing is possible.

In the sleep mode, the printer 1 is placed in a standby state in which a request for performing a print job or a user's input via the touch panel of the display unit 4 has not received for a predetermined time (e.g., 5 minutes) after printing processing is finished. The sleep mode is a power-saving mode in which energization of the heater of the fixing unit 2F is stopped, and the display unit 4 is in a non-displaying state as a backlight of the display panel is turned off. In the sleep mode, functions of the touch panel of the display unit 4 are activated to respond to a user's input promptly.

In the deep sleep mode, more power may be saved than the sleep mode when a request for executing a print job or a user's input has not received for a predetermined time (e.g., 5 minutes) since the printer 1 shifts to the sleep mode. As will be described in detail later, for example, only a portion of the power supply system 7 is operating in the deep mode and an apparatus drive voltage to be supplied from the power supply unit 10 to the printing unit 2 is reduced from 24 V to 6 V for power-saving. The controller 50 is configured to switch a principal processing unit from a main CPU (not depicted) to a sub CPU (not depicted) that consumes less power than the main CPU, for power-saving. In the deep sleep mode, functions of the touch panel of the display unit 4 are activated to respond to a user's input promptly.

In the off mode, more power may be saved than the deep sleep mode. As will be described in detail, a less portion of the power supply system 7 is operating in the off mode than in the deep sleep mode. For example, as a power button SW1 (refer to FIG. 2) is pressed by a user, the printer 1 shifts to the off mode.

Next, configuration of the tower tray 70 will be described. As depicted in FIG. 1, the tower tray 70 includes an option controller, e.g., a tower tray control unit 71, an option power supply, e.g., a tower tray low-voltage power supply 72, a drive load, e.g., a sheet supply mechanism 73, and a plurality of, for example, four, sheet supply trays T1, T2, T3, and T4.

The tower tray control unit 71 includes, for example, a microcomputer or micro controller unit (MCU). Hereinafter, the tower tray control unit 71 is referred to as "the MCU 71." The MCU 71 is configured to receive a control voltage of 3.3 V supplied from the power supply unit 10 of the printer 1, more specifically, from a main low-voltage power supply 20 (refer to FIG. 2) of the power supply unit 10, via the power supply line SL1.

The sheet supply mechanism 73 includes a pickup roller, a feeding roller, a drive source, e.g., a motor, a solenoid, a gear, and a fan. The sheet supply mechanism 73 is configured to be driven in association with the printing unit 2, based on controls of the MCU 71, and supply a sheet stored in a sheet supply tray T1-T4 to the printer 1, by driving, for example, the feeding roller.

The tower tray low-voltage power supply 72 is configured to generate an option drive voltage of 24 V to be supplied to the sheet supply mechanism 73, based on controls of the MCU 71. The tower tray low-voltage power supply 72 according to the illustrative embodiment is configured to change its mode based on controls of the MCU 71, and change a voltage value of the option drive voltage. For example, when the printer 1 is in the ready mode, the print mode, or the sleep mode, the tower tray low-voltage power supply 72 is placed in a mode (e.g., a normal mode) to supply an option drive voltage of 24 V. When the printer 1 is in the deep sleep mode and the off mode, the tower tray low-voltage power supply 72 is placed in a first low output mode in which generation of an option drive voltage is stopped. In this state, an option drive voltage is 0 V. The tower tray low-voltage power supply 72 has a second low output mode in which the tower tray low-voltage power supply 72 is configured to supply an option drive voltage of 6 V.

Figure 2:
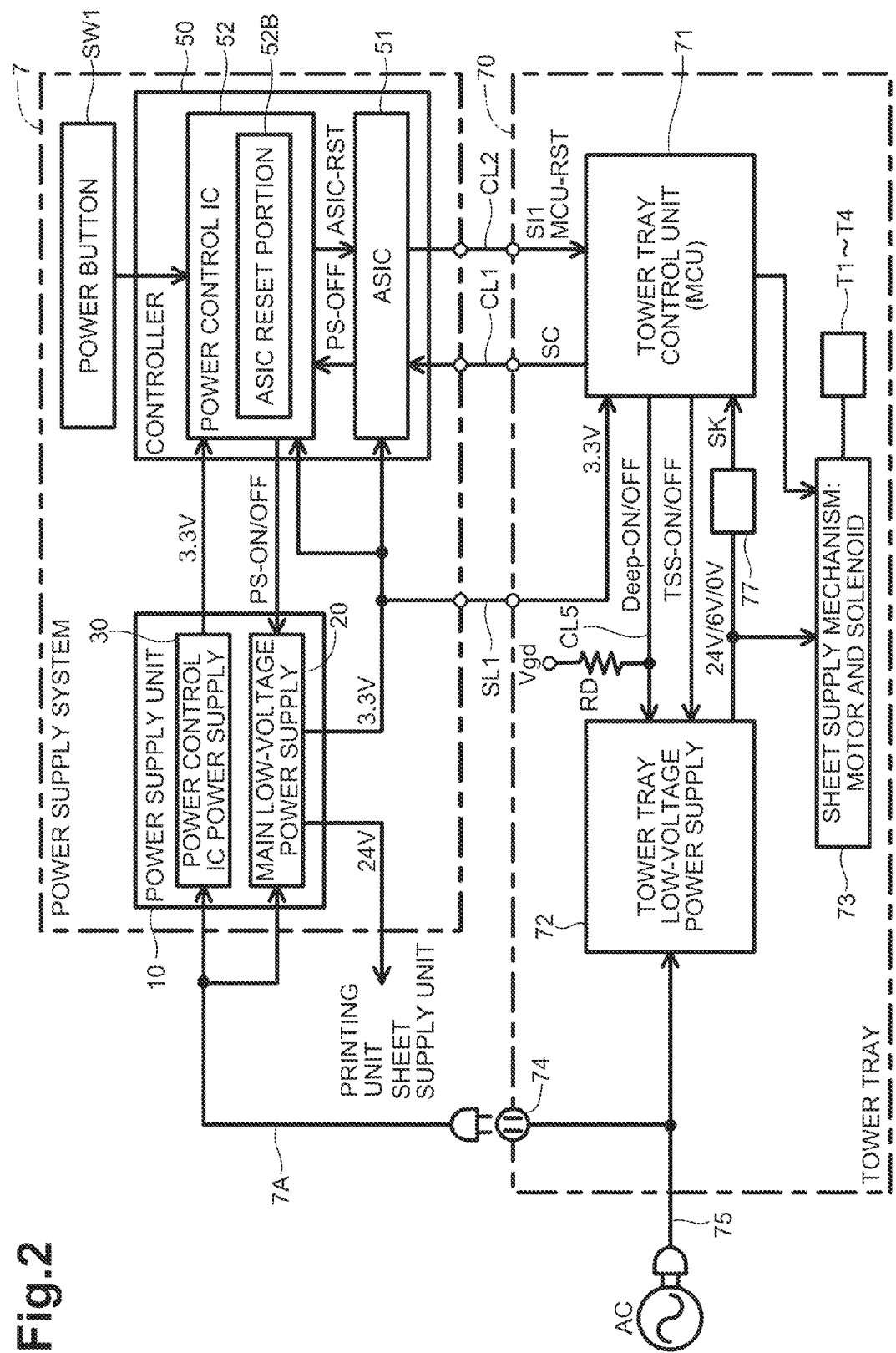
FIG. 2 is a block diagram illustrating power supply configuration of the printer system according to the illustrative embodiment.

More specifically, as depicted in FIG. 2, the tower tray low-voltage power supply 72 is configured to be turned on or off by a control signal (e.g., a tower tray low-voltage power supply signal TTS-ON/OFF) from the MCU 71. More specifically, the tower tray low-voltage power supply 72 is configured to control oscillation of a switching power supply to turn on or off. The MCU 71 according to the illustrative embodiment is configured to transmit a pulse signal for starting up or activating the tower tray low-voltage power supply 72 (hereinafter referred to as "an ON pulse") (not depicted), to the tower tray low-voltage power supply 72, as a tower tray low-voltage power supply signal TTS-ON/OFF, to activate the tower tray low-voltage power supply 72. An ON pulse may be transmitted, for example, in time with the startup of the tower tray low-voltage power supply 72. The MCU 71 is configured to transmit a pulse signal PS for turning the tower tray low-voltage power supply 72 off (hereinafter referred to as "an OFF pulse") (refer to FIG. 6), to the tower tray low-voltage power supply 72, to make the tower tray low-voltage power supply 72 stop generating an option drive voltage. An OFF pulse PS may be transmitted, for example, in time with the deep sleep mode of the printer 1. In the illustrative embodiment, the pulse width of an ON pulse is shorter than that of an OFF pulse PS. A time during which an ON pulse is kept at a high level is, for example, 0.22 ms. A time during which an OFF pulse PS is kept at a high level is, for example, 1.7 ms.

The tower tray low-voltage power supply 72 is configured to change a voltage value of an option drive voltage with a control signal (e.g., a Deep-ON/OFF signal) input from the MCU 71 via a signal line CL5. The MCU 71 is configured to transmit, for example, a low-level Deep-ON/OFF signal, to the tower tray low-voltage power supply 72, so that an option drive voltage is reduced from 24 V to 6 V and the tower tray low-voltage power supply 72 may be shifted to the second low output mode. The MCU 71 is configured to transmit, for example, a high-level Deep-ON/OFF signal, to the tower tray low-voltage power supply 72, so that an option drive voltage is increased to 24 V again, and tower tray low-voltage power supply 72 may be shifted to the normal mode.

A potential of a high-level Deep-ON/OFF signal is, for example, 3.3 V. A potential of a low-level Deep-ON/OFF signal is, for example, 0 V. The signal line CL5 is connected to a ground via a pull-down resistor RD. A ground voltage Vgd is supplied to the signal line CL5. Therefore, when a high-level Deep-ON/OFF signal is not transmitted from the MCU 71, a potential of the signal line CL5 is a ground potential (e.g., 0 V). As a potential of the signal line CL5 becomes the ground potential, the tower tray low-voltage power supply 72 is placed in a state that the tower tray low-voltage power supply 72 is receiving a low-level Deep-ON/OFF signal (e.g., 0 V), and outputs an option drive voltage of, for example, 6 V. The potential of a Deep-ON/OFF signal described above is an example and may be changed appropriately.

An option drive voltage output from the tower tray low-voltage power supply 72 is input to a comparator 77. The comparator 77 is configured to compare an option drive voltage with a reference voltage of, for example, 12 V, and transmit a comparison result to the MCU 71 as a detection signal SK. The comparator 77 is configured to output, for example, a high-level detection signal SK, to the MCU 71 when an option drive voltage is greater than or equal to a reference voltage and output a low-level detection signal SK to the MCU 71 when an option drive voltage is less than the reference voltage. Therefore, when an option drive voltage of 24 V is output from the tower tray low-voltage power supply 72, the comparator 77 transmits a high-level detection signal SK to the MCU 71. When an option drive voltage is 6 V or 0 V, the comparator 77 transmits a low-level detection signal SK to the MCU 71.

In the illustrative embodiment, a power supply capacity of the tower tray low-voltage power supply 72 is set to drive, for example, at least one sheet supply tray T1-T4 among a plurality of the sheet supply trays T1-T4. A plurality of the sheet supply trays T1-T4 does not operate at one time or at the same time. Therefore, a power supply capacity of the tower tray low-voltage power supply 72 is set to drive at least one sheet supply tray T1-T4. Thus, power-saving may be achieved for an option device, e.g., the tower tray 70. For example, four sheet supply trays T1-T4 may be arranged in this order from top to bottom in the tower tray 70. When a sheet is supplied to the printer 1 disposed above the tower tray 70 from the sheet supply tray T4 which is disposed lowermost among the four sheet supply trays T1-T4, rotation torque required to rotate the motor of the sheet supply mechanism 73 may become maximum. In other words, when a sheet is supplied from the lowermost sheet supply tray T4, power supplied from the tower tray low-voltage power supply 72 to the sheet supply mechanism 73 may become maximum. In this case, for example, a power supply capacity of the tower tray low-voltage power supply 72 may be preferably set to such a power supply capacity required to drive the sheet supply tray T4. A power supply capacity of the tower tray low-voltage power supply 72 is not limited thereto. For example, a power supply capacity of the tower tray low-voltage power supply 72 may be set to such a power supply capacity to simultaneously drive two or more sheet supply trays T1-T4.

Next, referring to FIGS. 2 and 3, configuration of the power supply system 7 will be described. The power supply system 7 includes a power switch, e.g., the power button SW1, the power supply unit 10, and the controller 50. The controller 50 includes an application specific integrated circuit (ASIC) 51 and a power control IC 52. The power button SW1 is configured to generate an ON signal or an OFF signal in response to the pressing of the power button SW1 and supply a signal to the power control IC 52.

As depicted in FIG. 2, the power supply unit 10 includes an apparatus power supply, e.g., the main body low-voltage power supply 20, and a power control IC power supply 30. The main low-voltage power supply 20 is constituted by, for example, a switching power supply, as depicted in FIG. 3. The main low-voltage power supply 20 includes a rectifying/smoothing circuit 21, a control IC 22, a voltage generating circuit 23, a transformer 24, a field effect transistor (FET) Q1, a rectifying/smoothing circuit 25, a voltage detecting circuit 26, and a DC-DC converter 27.

The main low-voltage power supply 20 is configured to rectify and smooth an AC voltage Vac of an AC power supply AC, to generate DC voltages of 24 V and 3.3 V in the ready mode, the print mode, and the sleep mode of the printer 1. The DC voltage of 24 V is output from a first output terminal OUT1. The DC voltage of 3.3 V is output from a second output terminal OUT2. The main low-voltage power supply 20 is configured to generate DC voltages of 6 V and 3.3 V in the deep sleep mode of the printer 1 for power saving. The DC voltages of 6 V and 3.3 V are output from the first output terminal OUT1 and the second output terminal OUT2, respectively.

The rectifying/smoothing circuit 21 is a so-called capacitor input type, and includes a bridge diode configured to rectify an AC voltage Vac (e.g., 240 V) of the AC power supply AC and a capacitor configured to smooth the rectified voltage and connected to the bridge diode. An output of the rectifying/smoothing circuit 21 is applied to a primary coil of the transformer 24.

The transistor Q1 is an N-channel MOSFET. The transistor Q1 is configured to be turned on or off in response to an on/off signal (e.g., a PWM signal) supplied to a gate of the transistor Q1 from the control IC 22. Accordingly, the primary side of the transformer 24 oscillates so that a voltage is induced at a secondary coil of the transformer 24.

The voltage generating circuit 23 is provided on the primary side of the transformer 24. The voltage generating circuit 23 is configured to supply a power supply voltage to the control IC 22 via a port Vcc by rectifying and smoothing a voltage induced at an auxiliary coil provided on the primary side of the transformer 24. The power supply voltage is supplied to an input port VH of the control IC 22 at the start of the main low-voltage power supply 20.

The rectifying/smoothing circuit 25 is configured to rectify and smooth a voltage induced at the secondary coil of the transformer 24, to generate an apparatus drive voltage, e.g., 24 V. The DC-DC converter 27 is configured to convert 24 V or 6 V input from the rectifying/smoothing circuit 25 via the voltage detecting circuit 26, into a control voltage, e.g., 3.3 V and to output 3.3 V.

The voltage detecting circuit 26 includes a photocoupler PC1 (for instance, a light emitting diode LED1). The voltage detecting circuit 26 is configured to make the light emitting diode LED1 of the photocoupler PC1 emit light in response to a detected level of 24 V output by the main low-voltage power supply 20. The photocoupler PC1 includes a phototransistor PT1 connected to a feedback port FB of the control IC 22. Therefore, a light signal of the light emitting diode LED1 is converted into an electric signal by the phototransistor PT1, and a detected value of the output of 24 V is fed back to the feedback port FB of the control IC 22.

The control IC 22 is configured to receive a power supply control signal PS-ON/OFF input to a control input port EN from a power control IC 52 (described below). The control IC 22 is configured to control an on/off signal output from an output port OUT to the transistor Q1, in response to the power supply control signal PS-ON/OFF, to control oscillation of the primary side of the transformer 24. In other words, the control IC 22 is configured to switch a state of the main low-voltage power supply 20 between an ON state and an OFF state, in response to the power supply control signal PS-ON/OFF. When the main low-voltage power supply 20 is in the ON state, the control IC 22 is configured to switch an output state of the apparatus drive voltage between a normal output (e.g., 24 V) and a low output (e.g., 6 V), in response to a command from the ASIC 51.

In an ON state of the main low-voltage power supply 20, an output of the apparatus drive voltage may be high (e.g., 24 V) or low (e.g., 6 V). The high output of the apparatus drive voltage corresponds to the ready mode, the print mode, and the sleep mode of the printer 1, and the primary side of the transformer 24 is oscillated to output 24 V and 3.3 V from the main low-voltage power supply 20. The low output of the apparatus drive voltage corresponds to the deep sleep mode, and the primary side of the transformer 24 is oscillated and the time in which the transistor Q1 is turned on and off is controlled by the control IC 22, to output 6 V and 3.3 V from the main low-voltage power supply 20. An OFF state of the main low-voltage power supply 20 corresponds to the off mode of the printer 1. In the OFF state, an output of the apparatus drive voltage is 0 V, and oscillation of the transformer 24 is stopped to stop an output of the main low-voltage power supply 20.

The tower tray low-voltage power supply 72 is constituted by, for example, a switching power supply, similar to the main low-voltage power supply 20. The tower tray low-voltage power supply 72 includes a rectifying/smoothing circuit, a control IC, a voltage generating circuit, a transformer, a FET, a rectifying/smoothing circuit, and a voltage detecting circuit, similar to those of the main low-voltage power supply 20. The MCU 71 is configured to control the tower tray low-voltage power supply 72.

Next, configuration of the power control IC power supply 30 will be described. The power control IC power supply 30 is a low-capacity power supply and has a power supply capacity smaller than that of the main low-voltage power supply 20. Regardless of operating states of the main low-voltage power supply 20, in other words, regardless of modes of the printer 1, the power control IC power supply 30 is configured to supply power to the power control IC 52. The power control IC power supply 30 is configured to supply power from the AC power supply AC to the power control IC 52 of the controller 50 and a control signal transmission unit 53 in the respective modes of the printer 1.

Figure 3:
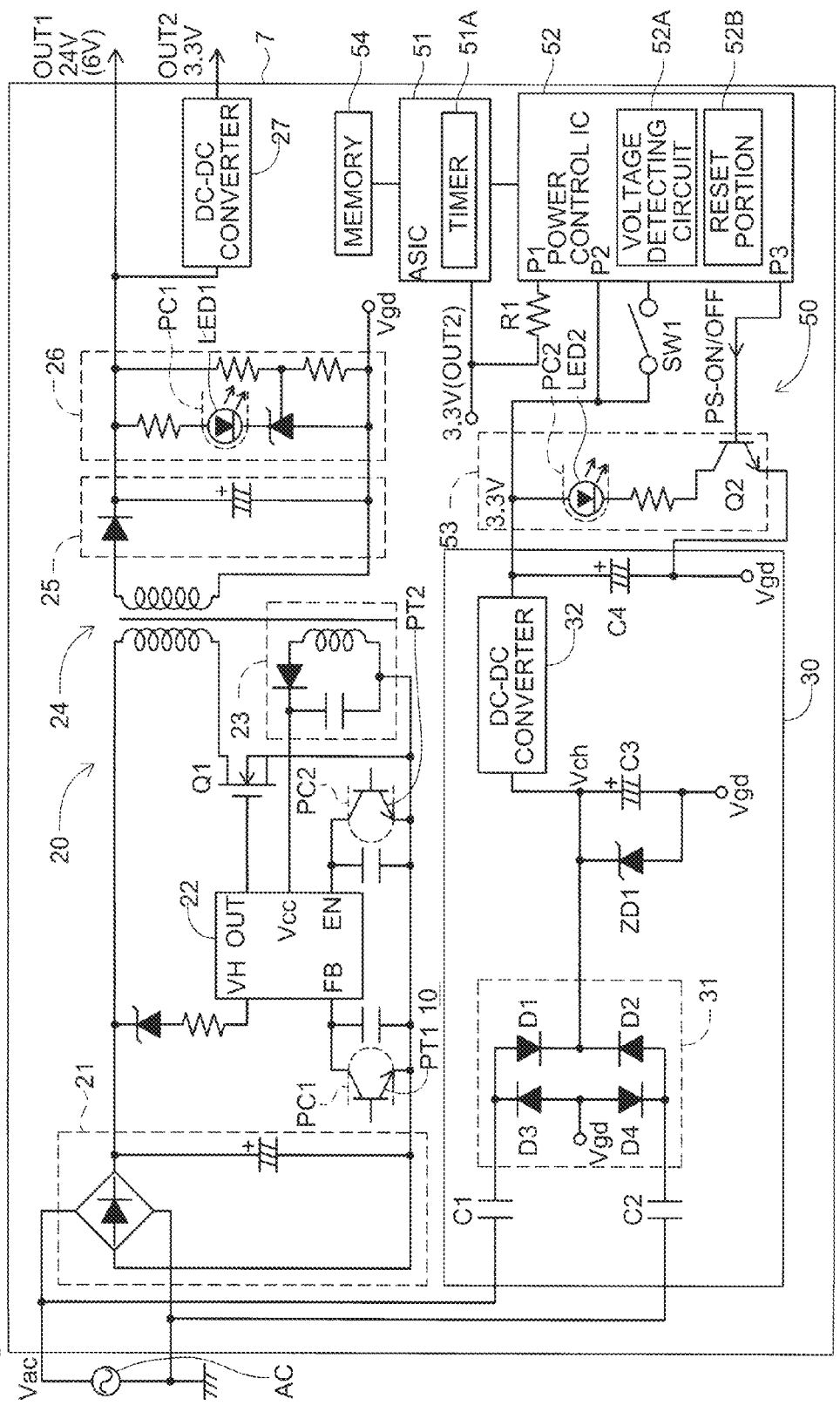
FIG. 3 is a circuit diagram illustrating power supply configuration according to the illustrative embodiment.

For example, as depicted in FIG. 3, the power control IC power supply 30 includes a first capacitor C1, a second capacitor C2, a rectifier 31, a Zener diode ZD1, a smoothing capacitor C3, a DC-DC converter 32, and a storage capacitor C4. The rectifier 31 is connected between the first capacitor C1 and the second capacitor C2. The rectifier 31 is configured to rectify the AC voltage Vac applied to the capacitors C1 and C2. The rectifier 31 includes a bridge circuit comprising four diodes D1, D2, D3, and D4. Anodes of the diodes D3 and D4 are connected to a ground. A ground voltage Vgd is supplied to the anodes of the diodes D3 and D4.

The smoothing capacitor C3 is connected to the rectifier 31. The smoothing capacitor C3 is configured to smooth the rectified AC voltage to generate a smoothed voltage Vch (e.g., 5 V). The Zener diode ZD1 is configured to suppress the smoothed voltage Vch from rising when the AC voltage Vac of the AC power supply AC rises. The DC-DC converter 32 is configured to convert the smoothing voltage Vch into 3.3 V, which is supplied to the power control IC 52 and the control signal transmission unit 53.

The storage capacitor C4 is connected to an output side of the DC-DC converter 32. The storage capacitor C4 is configured to be charged with 3.3 V output from the DC-DC converter 32. The charged power of the storage capacitor C4 is used for a drive current for a light emitting diode LED2 of a photocoupler PC2 of the control signal transmission unit 53, for example, when the printer 1 shifts from the off mode to the ready mode. The capacitance of the smoothing storage capacitor C3 and the storage capacitor C4 may be appropriately selected, so that it may be possible to accumulate an amount of power in the off mode.

Next, configuration of the controller 50 will be described. As depicted in FIG. 3, the controller 50 includes an application specific integrated circuit (ASIC) 51, a power control IC 52, a control signal transmission unit 53, and a memory 54. The ASIC 51 is configured to mainly control the printing unit 2 of the printer 1 and the MCU 71. The ASIC 51 includes a timer 51A. The timer 51A is configured to measure a time when the printer 1 shifts from the ready mode to the sleep mode and from the sleep mode to the deep sleep mode.

The ASIC 51 is configured to receive power of 3.3 V from the DC-DC converter 27 of the main low-voltage power supply 20 in respective modes other than the off mode. In other words, the ASIC 51 is configured to operate in respective modes other than the off mode with power supply and stop with power supply stopped as an output of the main low-voltage power supply 20 is stopped, e.g., as the printer 1 shifts to the off mode.

The power control IC 52 includes a voltage detecting circuit 52A and an ASIC reset portion 52B. A port P1 of the power control IC 52 is connected to an output terminal OUT2 of the DC-DC converter 27, via a resistor R1. The power control IC 52 is configured to detect 3.3 V from outputs of the output terminal OUT2, and monitor outputs of the main low-voltage power supply 20. A power supply port P2 of the power control IC 52 is connected to an output side of the power control IC power supply 30. Regardless of modes of the printer 1, power is supplied from the power control IC power supply 30 to the power control IC 52.

The power control IC 52 is configured to control switching between an operation mode in which the main low-voltage power supply 20 is operated, and a stop mode in which oscillation of the main low-voltage power supply 20 is stopped, in response to switching of modes of the printer 1. More specifically, the control signal transmission unit 53 includes the photocoupler PC2 (for instance, the light emitting diode LED2) and a transistor Q2. An anode of the light emitting diode LED2 is connected to a power supply line of 3.3 V from the power control IC power supply 30. The light emitting diode LED2 constitutes the photocoupler PC2 together with the phototransistor PT2 connected to the control input port EN of the control IC 22 of the main low-voltage power supply 20. The transistor Q2 is connected between a cathode of the light emitting diode LED2 and a ground. As a pulsed power supply control signal PS-ON/OFF is output from a control port P3 of the power control IC 52 to a base of the transistor Q2, the power supply control signal PS-ON/OFF is optically transmitted via the photocoupler PC2 and is input to the control input port EN of the control IC 22. Therefore, as the power control IC 52 outputs a pulsed power supply control signal PS-ON/OFF to the control IC 22, the main low-voltage power supply 20 may be switched between on and off. Regardless of whether the main low-voltage power supply 20 is turned on or off, power is supplied from the power control IC power supply 30 to the power control IC 52 and the control signal transmission unit 53.

The memory 54 includes a read-only memory (ROM) and a random-access memory (RAM). The ROM stores various programs to be executed by the ASIC 51. The RAM stores various data when programs are executed. The power button SW1 is connected between the control signal transmission unit 53 and the power control IC 52. The power button SW1 is configured to output an ON signal or an OFF signal to the power control IC 52 in association with the pressing of the power button SW1. The main low-voltage power supply 20 may be switched between on and off, in other words, setting and cancellation of the off mode may be instructed to the power control IC 52, as a user presses or operates the power button SW1.

The printer system 100 or the printer 1 includes a dedicated power cord 7A configured to connect the printer 1 and the tower tray 70, as depicted in FIG. 2. The tower tray 70 includes a connecting portion 74 to which the dedicated power cord 7A is connected, and a power cord 75 including a plug. To use the printer system 100, the power cord 75 of the tower tray 70 is connected to the AC power supply AC, and the dedicated power cord 7A is connected to the connecting portion 74. The printer 1 is connected to the AC power supply AC via the dedicated power cord 7A. Thus, the power cord routing for connecting the printer system 100 to the AC power supply AC may be facilitated. Connection of the printer system 100 to the AC power supply AC is not limited a manner described above. For example, the power supply system 7 and the tower tray 70 may be connected separately to the AC power supply AC.

Next, referring to FIGS. 4-6, power supply control sequence when the power cord 75 is connected to the AC power supply AC (a time t1 in FIG. 6) in a state in which the dedicated power cord 7A has been connected to the connecting portion 74, will be described. Hereinafter, "step" may be abbreviated as "S." The power control IC power supply 30 and the main low-voltage power supply 20 start up or are activated as power is supplied thereto, via the power cord 75 and the dedicated power cord 7A (S13). Similarly, the tower tray low-voltage power supply 72 starts up or is activated as power is supplied thereto, via the power cord 75 (S13). In this state, the MCU 71 has not yet started up and the ground voltage Vgd is supplied to the signal line CL5. Therefore, the tower tray low-voltage power supply 72 is in the second low output mode (refer to a time t3) in which an option drive voltage of 6 V is output.

The power control IC power supply 30 supplies 3.3 V to activate the power control IC 52 (S15). As described above, the power control IC 52 is activated with power supplied from the power control IC power supply 30. Therefore, even when the main low-voltage power supply 20 is not activated, the power control IC 52 may detect whether the power button SW1 is turned on or off The main low-voltage power supply 20 generates, after activated, a voltage of 24 V (e.g., an apparatus drive voltage) for a power system and a voltage of 3.3 V (e.g., a control voltage) for a logic system. The main low-voltage power supply 20 supplied 24 V to the printing unit 2 and the sheet supply unit 5 and supplies 3.3 V to the ASIC 51, the power control IC 52 and the MCU 71 (refer to the time t3 in FIG. 6). With the supply of 3.3 V, each clock signal generating circuit (not depicted) generates a corresponding clock signal (e.g., an ASIC-CLK signal) to be used by the ASIC 51 and a corresponding clock signal (e.g., a MCU-CLK signal) to be used by the MCU 71.

In a time t5 after the voltage detecting circuit 52A (refer to FIG. 3) of the power control IC 52 detects 3.3 V, the ASIC reset portion 52B of the power control IC 52 transmits a high-level ASIC reset signal for activating the ASIC 51 to the ASIC 51. Thus, activation of the ASIC 51 completes (S19).

The ASIC 51 transmits, after activated, a high-level MCU reset signal MCU-RST for activating the MCU 71 to the MCU 71, via the communication line CL2, to activate the MCU 71 (step S19, refer to a time t6). Thus, activation of the MCU 71 completes. As ASIC 51 is activated, the ASIC 51 executes an initial setting (S21). An initial setting is, for example, to correct error in time information to be used for internal processing.

Thereafter, as the ASIC 51 completes an initial setting, the ASIC 51 transmits a command signal SI1 (e.g., a command) for stopping an operation of the tower tray low-voltage power supply 72 to the MCU 71 via the communication line CL2, to turn the whole system 100 off (S23, refer to a time t7).

As the MCU 71 receives the command signal SI1, the MCU 71 transmits an

OFF pulse PS (e.g., a tower tray low-voltage power supply signal TTS-ON/OFF) to the tower tray low-voltage power supply 72 (S25, refer to a time t9). As the tower tray low-voltage power supply 72 receives the OFF pulse PS, the tower tray low-voltage power supply 72 stops its operation (refer to a time t11).

As the MCU 71 detects that the tower tray low-voltage power supply 72 is stopped, with a method that uses a detection signal SK input from the comparator 77 (described below), the MCU 71 transmits a complete command SC representing that the tower tray low-voltage power supply 72 is stopped, to the ASIC 51 via the communication line CL1 (S27, refer to the time t13).

As the ASIC 51 receives the complete command SC, the ASIC 51 transmits t a low-level MCU reset signal MCU-RST for stopping (or resetting) the MCU 71, to the MCU 71 via the communication line CL2, to reset the MCU 71 (refer to a time t15). Thus, an operation of the MCU 71 is stopped (or reset) (S29). The ASIC 51 transmits a power OFF command PS-OFF for stopping the main low-voltage power supply 20, to the power control IC 52 (S31, refer to a time t17).

The process in S29 in which the MCU 71 is reset may be omitted. As a voltage is reduced from 3.3 V and an ASIC reset signal ASIC-RST becomes at low-level (refer to a time t19) after the main low-voltage power supply 20 is stopped, the MCU reset signal MCU-RST may be automatically placed at low level and be reset by an external pull-down resistor, similar to the pull-down resistor RD depicted in FIG. 2.

As the power control IC 52 receives the power OFF command PS-OFF from the ASIC 51, the power control IC 52 generates a pulsed power supply control signal PS-ON/OFF for stopping the main low-voltage power supply 20. The power control IC 52 transmits the power supply control signal PS-ON/OFF, to the main low-voltage power supply 20 via the control signal transmission unit 5 (refer to FIG. 3), to stop the main low-voltage power supply 20 (S33). Thus, in the illustrative embodiment, after the stop of the tower tray low-voltage power supply 72 is confirmed (S27), the main low-voltage power supply 20 is stopped (S33).

When a voltage value (e.g., 3.3 V) detected in the voltage detecting circuit 52A is reduced to a predetermined value (e.g., 1.5 V), the power control IC 52 transmits a low-level ASIC reset signal ASIC-RST, to the ASIC 51 (S35, refer to time t19). Thus, an operation of the ASIC 51 is stopped. In this case, after reduction in the power supply voltage (3.3 V) is confirmed, in other words, after the stop of an operation of the main low-voltage power supply 20 is confirmed, the ASIC 51 may be reset (or turned off). Thus, the printer system 100, except the power control IC power supply 30 configured to supply power to the power control IC 52, is turned off, and shifts to the off mode (S37).

Figure 7:
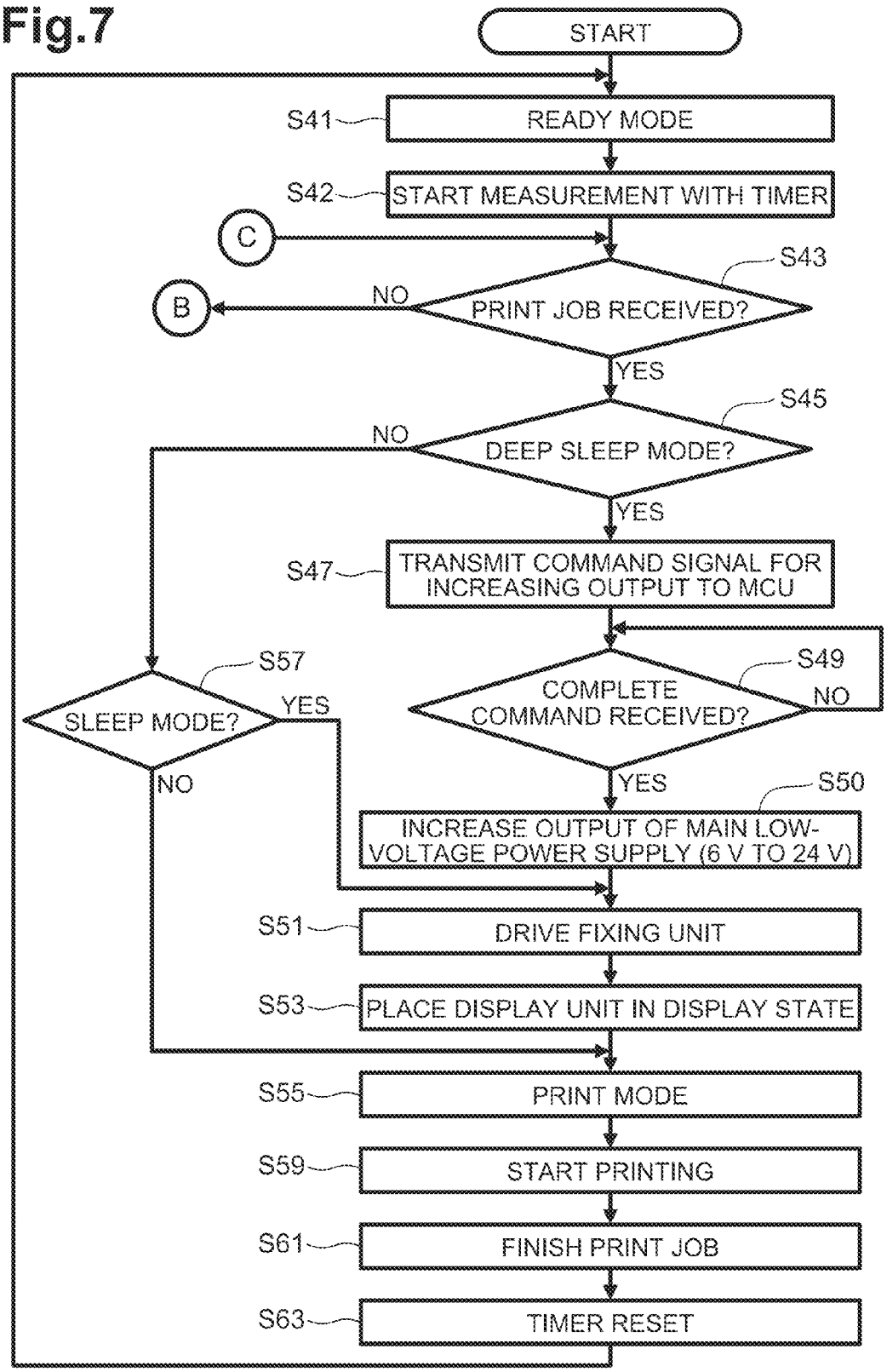
FIG. 7 is a flowchart depicting power supply control sequence performed by a controller at mode shift of a printer.

Next, power supply control sequence of the controller 50 at mode shift of the printer 1 will be described referring to FIGS. 7 and 8. Processes depicted in FIG. 7 may be started, after the power supply control (in FIGS. 4 and 5) performed as the power cord 75 is connected to the AC power supply AC is finished (S37 in FIG. 5) and, for example, the power button SW1 is pressed in the off mode. As the power button SW1 is pressed in the off mode, a pulsed power supply control signal PS-ON/OFF is transmitted from the power control IC 52 to the main low-voltage power supply 20 to start up or activate the main low-voltage power supply 20. First, with the activation of the main low-voltage power supply 20, the controller 50 is activated and the printer 1 is placed in the ready mode (S41). The controller 50 starts measuring, with the timer 51A, a time in which the printer 1 is placed in the ready mode (S42). The controller 50 determines whether a print job is received via the communication unit 3A when the printer 1 is in the ready mode (S43). For example, a print job is print data including information representing that the tower tray 70 is used, in other words, a size of a sheet stored in any of the sheet supply trays T1-T4 of the tower tray 70 is designated. Therefore, the controller 50 places the tower tray 70 in a usable condition to execute a print job by shifting the printer 1 to the print mode.

Figure 8:
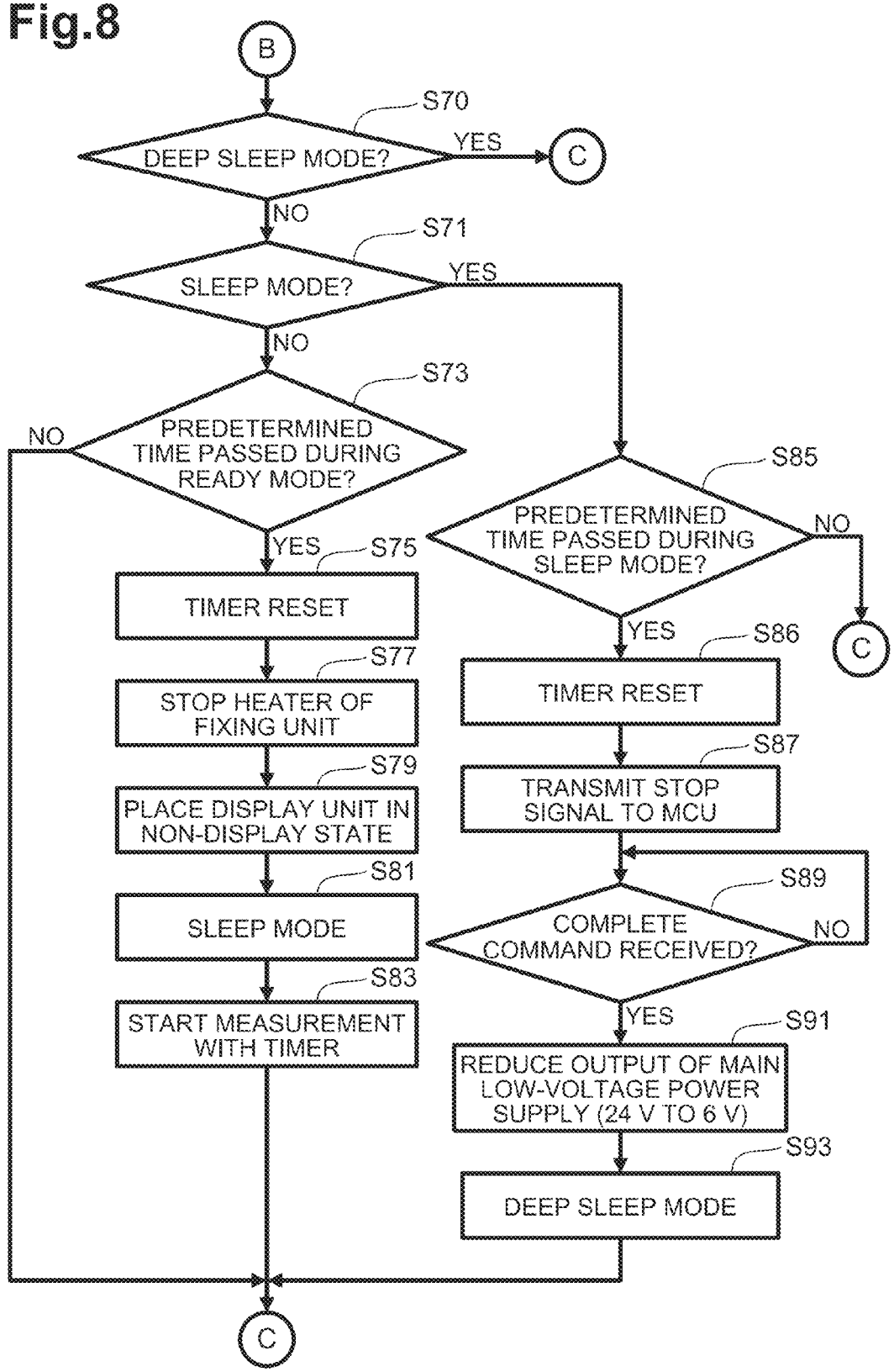
FIG. 8 is a flowchart depicting power supply control sequence performed by the controller at mode shift of the printer.

A process in S43 is executed after the printer 1 shifts to the sleep mode (S81) or to the deep sleep mode (S93) in FIG. 8. When the controller 50 determines that a print job is received (S43: YES), the controller 50 determines whether the current mode of the printer 1 is the deep sleep mode (S45). When the controller 50 determines that the current mode is the deep sleep mode (S45: YES), the controller 50 transmits a command signal SI1 for increasing an option drive voltage of the tower tray low-voltage power supply 72 (e.g., 0 V to 24 V), from the ASIC 51 to the MCU 71 (S47). The MCU 71 transmits an ON pulse to the tower tray low-voltage power supply 72 to resume oscillation (e.g., to output 6 V). Thereafter, the MCU 71 transmits a high-level Deep-ON/OFF signal to the tower tray low-voltage power supply 72 such that the tower tray low-voltage power supply 72 outputs 24 V.

Thereafter, the controller 50 determines whether a complete command SC representing an option drive voltage is increased, is received from the MCU 71 that has detected that the option drive voltage is increased, with a method (described below) that uses a detection signal SK input from the comparator 77 (S49). Until the controller 50 receives a complete command SC (S49: NO), the controller 50 repeats determination in S49. As the controller 50 receives a complete command SC (S49:YES), the controller 50 performs control for increasing the apparatus drive voltage (e.g., 6 V to 24 V) that is supplied from the main low-voltage power supply 20 to the printing unit 2 and the sheet supply unit 5 (S50). More specifically, for example, the ASIC 51 of the controller 50 transmits a command for increasing the apparatus drive voltage to the control IC 22 (refer to FIG. 3) of the main low-voltage power supply 20. The control IC 22 performs switching control for the transistor Q1 in response to the command, so that 24 V is output from the first output terminal OUT1. In the deep sleep mode, energization of the heater of the fixing unit 2F is stopped. Therefore, the controller 50 performs processing to start energization of the heater of the fixing unit 2F (S51). The controller 50 places the display unit 4 in a display state with the backlight of the display panel turned on (S53). The controller 50 places the printer 1 in the print mode in which printing is possible (S55).

In S45, when the controller 50 determines that the current mode is not the deep sleep mode (S45: NO), the controller 50 determines whether the current mode is the sleep mode (S57). When the controller 50 determines that the current mode is the sleep mode (S57: YES), the controller 50 executes a process S51 and its subsequent processes. In the sleep mode, energization of the heater of the fixing unit 2F is stopped. In S51, the controller 50 performs processing to start energization of the heater of the fixing unit 2F. When the controller 50 determines that the current mode is not the sleep mode (S57: NO), in other words, when the current mode is the ready mode, the controller 50 executes a process S 55 and its subsequent processes.

As the printer 1 shifts to the print mode, the controller 50 controls the printing unit 2 to execute a received print job (S59). More specifically, the controller 50 executes controls, for example, for raising a temperature of the heater of the fixing unit 2F from a standby temperature to a printing temperature at which printing is possible and for supplying a sheet from the tower tray 70. As a last page is discharged and the print job is finished (S61), the controller 50 executes control, for example, for reducing the temperature of the heater to the standby temperature. The controller 50 resets the timer 51A (S63) and places the printer 1 in the ready mode (S41).

In S43, when the controller 50 determines that a print job is not received (S43: NO), the controller 50 determines whether the current mode is the deep sleep mode (S70 in FIG. 8). When the current mode is the deep sleep mode (S70:

YES), the controller 50 executes a process S43 and its subsequent processes. The controller 50 maintains the deep sleep mode of the printer 1.

When the current mode is not the deep sleep mode (S70: NO), the controller 50 determines whether the current mode is the sleep mode (S71). When the current mode is not the sleep mode, in other words, when the current mode is the ready mode (S71: NO), the controller 50 determines a time elapsed during the ready mode based on the time measured by the timer 51A (S73).

When the time measured by the timer 51A is less than 5 minutes (S73: NO), the controller 50 executes a process in S43 in FIG. 7 and its subsequent processes. The controller 50 maintains the ready mode of the printer 1. When the time measured by the timer 51A is greater than or equal to 5 minutes, in other words, when 5 minutes has passed without receiving any print job or an input operation by a user via the touch panel of the display unit 4 during the ready mode (S73: YES), the controller 50 starts processing to shift the printer 1 to the sleep mode.

The controller 50 resets the timer 51A (S75). The controller 50 stops or turns off the energization of the heater of the fixing unit 2F (S77), and places the display unit 2 in a non-display state for power-saving (S79). The controller 50 shifts or places the printer 1 into the sleep mode (S81) and the controller 50 starts to measure a time that elapses during the sleep mode, by the timer 51A (S83).

In S71, when the controller 50 determines that the current mode is the sleep mode (S71: YES), the controller 50 determines a time elapsed during the sleep mode based on the time measured by the timer 51A (S85) When the time measured by the timer 51A is less than 5 minutes (S85: NO), the controller 50 executes a process in S43 in FIG. 7 and its subsequent processes. The controller 50 maintains the sleep mode of the printer 1.

When the controller 50 determines that 5 minutes has passed during the sleep mode (S85: YES), the controller 50 starts processing for shifting the printer 1 to the deep sleep mode. The controller 50 resets the timer 51A (S86). The controller 50 transmits a command signal SI1 for stopping the tower tray low-voltage power supply 72 (e.g., 24 V to 0 V) from the ASIC 51 to the MCU 71 (S87).

The controller 50 determines whether a complete command SC representing that the tower tray low-voltage power supply 72 is stopped, is received from the MCU 71 (S89). Until a complete command SC is received (S89: NO), the controller 50 repeats determination in S89. When a complete command SC is received (S89: YES), the controller 50 performs control for reducing the apparatus drive voltage (e.g., 24 V to 6 V) supplied from the main low-voltage power supply 20 to the printing unit 2 (S91). The controller 50 shifts the printer 1 to the deep sleep mode (S93). The controller 50 starts a process S43 in FIG. 7 and its subsequent processes.

Figure 9:
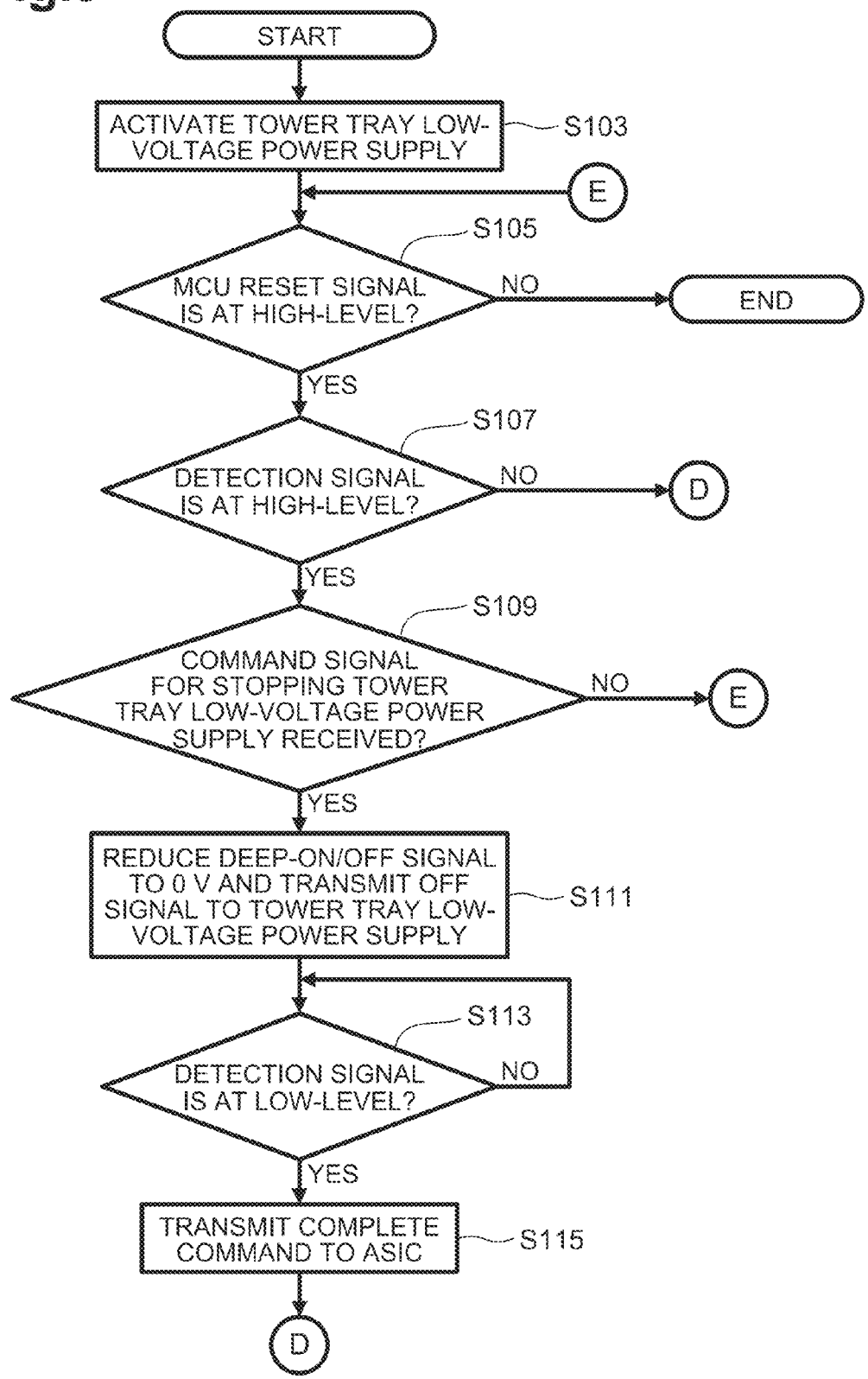
FIG. 9 is a flowchart depicting power supply control sequence performed by a tower tray control unit at mode shift of the printer.

Next, power supply control sequence performed by the MCU 71 at mode shift of the printer 1, will be described referring to FIGS. 9 and 10. For example, as the MCU 71 receives a high-level MCU reset signal MCU-RST from the ASIC 51 and is activated, processing depicted in FIG. 9 is started. The MCU 71 starts up or activates the tower tray low-voltage power supply 72 (S103).

The MCU 71 determines whether a MCU reset signal MCU-RST received from the ASIC 51 is at high level or low level (S105). When the MCU reset signal MCU-RST is at low level (S105: NO), the MCU 71 performs processing for stopping the MCU 71.

When the MCU reset signal MCU-RST is at high level (S105: YES), the MCU 71 determines whether a detection signal SK from the comparator 77 (refer to FIG. 2) is at high-level (S107). When the MCU 71 receives a low-level detection signal SK (S107: NO), the MCU 71 executes a process in S117 in FIG. 10 and its subsequent processes.

When the MCU 71 receives a high-level the detection signal SK (S107: YES), the MCU 71 determines whether a command signal SI1 for stopping the tower tray low-voltage power supply 72 (e.g., 24 V to 0 V), is received from the ASIC 51 (S109). When the MCU 71 does not receive a command signal SI1 for stopping the tower tray low-voltage power supply 72 (S109: NO), the MCU 71 executes a process in S105 and its subsequent processes.

As the MCU 71 receives a command signal SI1 for stopping the tower tray low-voltage power supply 72 (S109: YES), the MCU 71 performs processing to reduce a Deep-ON/OFF signal (e.g., 3.3 V to 0 V) and transmits an OFF pulse PS for turning the tower tray low-voltage power supply 72 off, to the tower tray low-voltage power supply 72 (S111). When the tower tray low-voltage power supply 72 receives a Deep-ON/OFF signal of 0 V, via the signal line CL5, the tower tray low-voltage power supply 72 performs processes for reducing an option drive voltage (e.g., 24 V to 6 V). When the tower tray low-voltage power supply 72 receives an OFF pulse PS, the tower tray low-voltage power supply 72 performs processing for stopping the tower tray low-voltage power supply 72 and is placed in the first low output mode. The MCU 71 determines a signal level of a detection signal SK input from the comparator 77 (S113). Until a low-level detection signal SK is input from the comparator 77 (S113: NO), the MCU 71 repeats determination in S113. When a low-level detection signal SK is input from the comparator 77 (S113:YES), the MCU 71 determines that the tower tray low-voltage power supply 72 is stopped, and transmits a complete command SC representing the tower tray low-voltage power supply 72 is stopped, to the ASIC 51 (S115).

Figure 10:
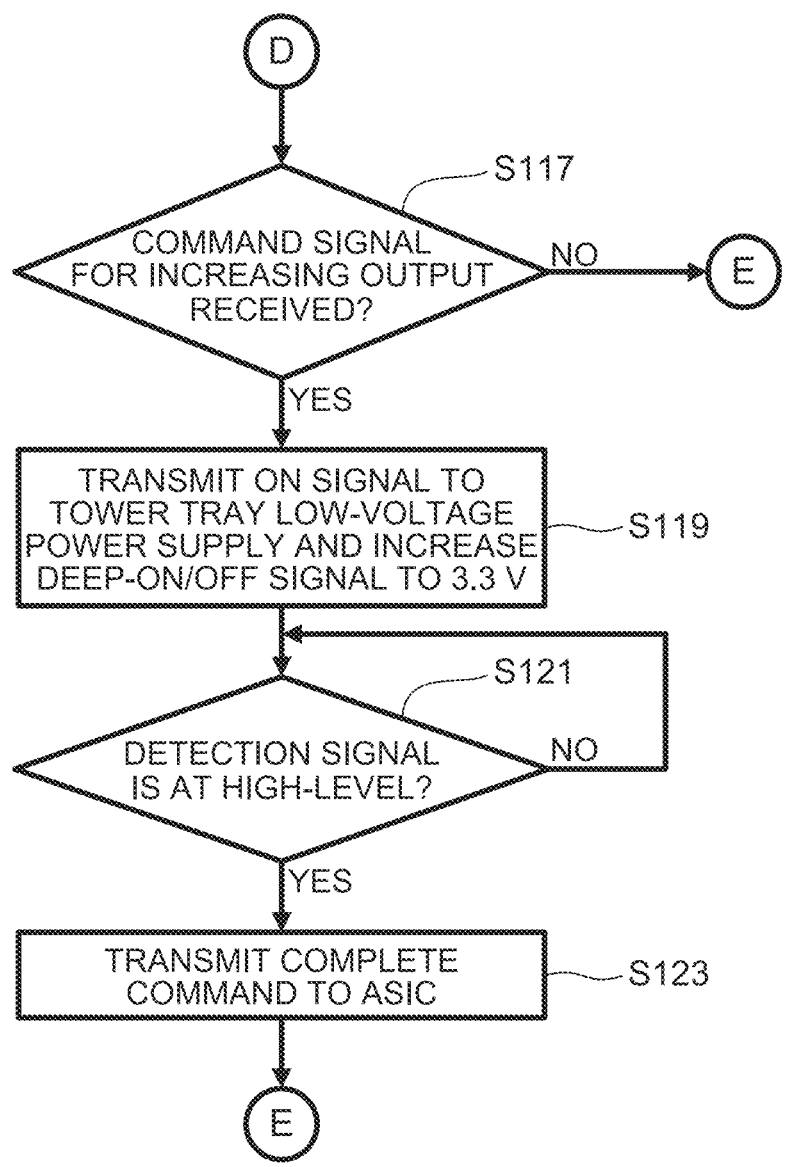
FIG. 10 is a flowchart depicting power supply control sequence performed by the tower tray control unit at mode shift of the printer.

Then, the MCU 71 determines whether a command signal SI1 for increasing an option drive voltage of the tower tray low-voltage power supply 72 (e.g., 0 V to 24 V) is received (S117 in FIG. 10). When the MCU 71 does not receive a command signal SI1 for increasing an option drive voltage of the tower tray low-voltage power supply 72 (S117: NO), the MCU 71 executes a process in S105 and its subsequent processes.

As the MCU 71 receives a command signal SI1 for increasing an option drive voltage of the tower tray low-voltage power supply 72 (S117: YES), the MCU 71 transmits an ON pulse for turning the tower tray low-voltage power supply 72 on, to the tower tray low-voltage power supply 72 and performs processing for increasing a Deep-ON/OFF signal (e.g., 0 V to 3.3 V) (S119). As the tower tray low-voltage power supply 72 receives the ON pulse, the tower tray low-voltage power supply 72 performs startup processing (e.g., 0 V to 6 V). When the tower tray low-voltage power supply 72 receives a Deep-ON/OFF signal of 3.3 V via the signal line CL5, the tower tray low-voltage power supply 72 performs processing for increasing an option drive voltage (e.g., 6 V to 24 V), and is placed in the normal mode. The MCU 71 determines a signal level of a detection signal SK input from the comparator 77 (S121). Until a high-level of a detection signal SK is input from the comparator 77 (S121: NO), the MCU 71 repeats determination in S121. When a high-level detection signal SK is input from the comparator 77 (S121: YES), the MCU 71 determines that an option drive voltage of the tower tray low-voltage power supply 72 is increased to 24 V and transmits a complete command SC representing that an option drive voltage of the tower tray low-voltage power supply 72 is increased to 24 V, to the ASIC 51 (S123). The MCU 71 executes a process in S105 and its subsequent processes. Thus, as the controller 50 detects a complete command SC in response to a command signal SI1, a state of the tower tray 70 may be confirmed.

Following effects may be obtained in the illustrative embodiment.

<Effect 1> The main low-voltage power supply 20 of the printer 1 is configured to supply power to the ASIC 51 of the controller 50 of the printer 1. The main low-voltage power supply 20 is also configured to supply a control voltage of 3.3 V to the MCU 71 of the tower tray 70, via the power supply line SL1. Thus, the MCU 71 may be operated when the ASIC 51 is activated (e.g., in the print mode and the ready mode). Thus, power-saving may be achieved.

The ASIC 51 transmits a command signal SI1 to the MCU 71, via the communication line CL2, so that an operation state of the tower tray low-voltage power supply 72 may be changed. For example, as the ASIC 51 completes an initial setting at processing performed when the power cord 75 is connected to the AC power supply AC, and the dedicated power cord 7A is connected to the connecting portion 74, as depicted in FIGS. 4 and 5, the ASIC 51 transmits a command signal SI1 for stopping the tower tray low-voltage power supply 72 to the MCU 71. Accordingly, the tower tray low-voltage power supply 72 is stopped (refer to S23 in FIG. 4). Thus, the ASIC 51 may stop the tower tray low-voltage power supply 72, before the main low-voltage power supply 20 of the power supply unit 10 is stopped.

<Effect 2> As the MCU 71 stops the tower tray low-voltage power supply 72 after the MCU 71 has received a command signal SI1 for stopping the tower tray low-voltage power supply 72 from the ASIC 51, the MCU 71 transmits a complete command SC representing that the tower tray low-voltage power supply 72 is stopped, to the ASIC 51 via the communication line CL1 (S27). As the ASIC 51 receives the complete command SC, the ASIC 51 executes processing for stopping the main low-voltage power supply 20 (e.g., S31 and S33 in FIG. 5). Thus, the tower tray low-voltage power supply 72 may be reliably stopped before the main low-voltage power supply 20 is stopped.

Figure 4:
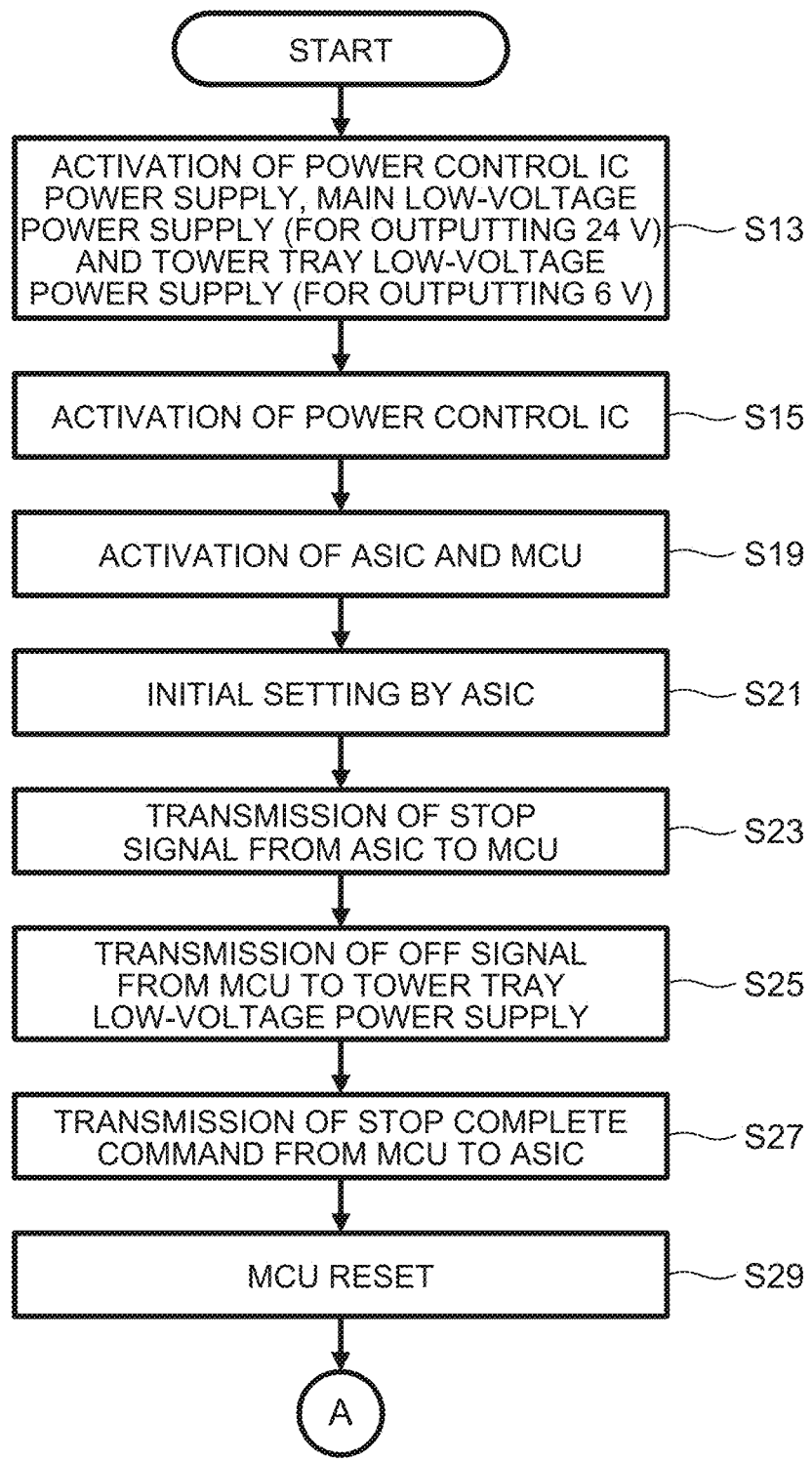
FIG. 4 is a flowchart depicting power supply control sequence when a power cord is connected.
Figure 5:
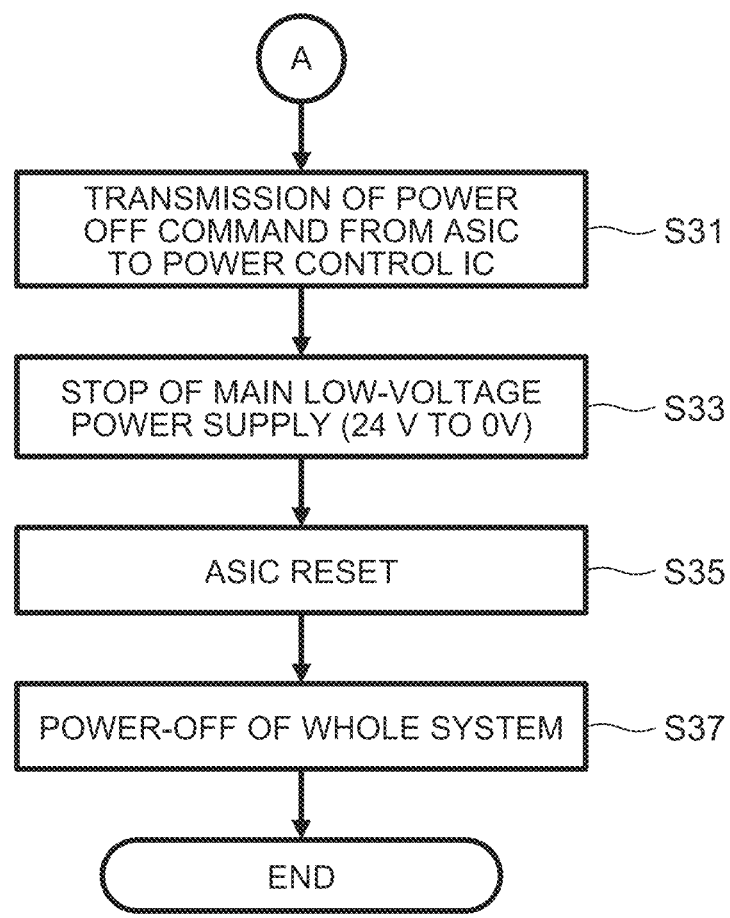
FIG. 5 is a flowchart depicting power supply control sequence when the power cord is connected.
Figure 6:
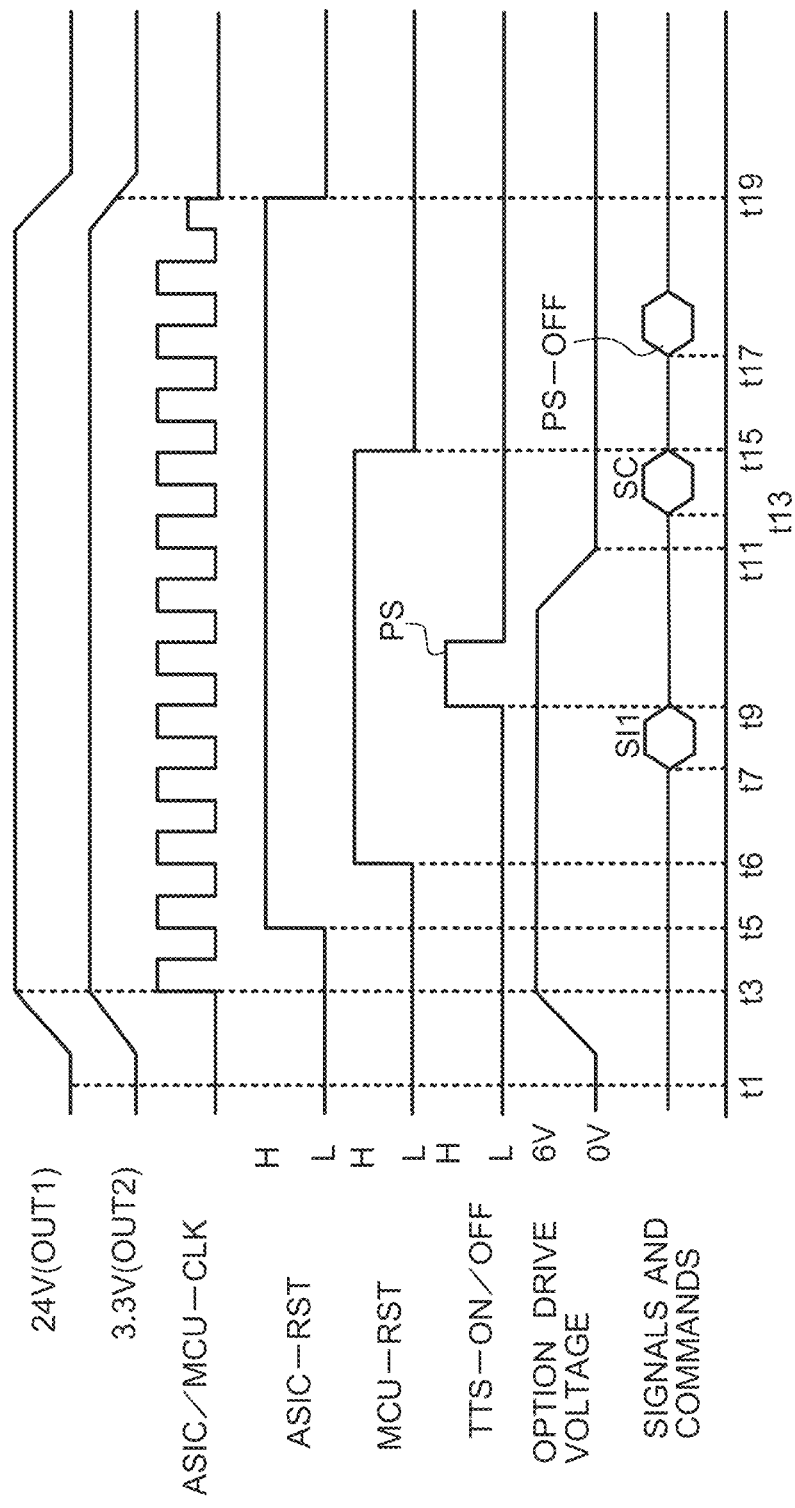
FIG. 6 is a time chart depicting transition of respective signals when the power cord is connected.

<Effect 3> The printer system 100 according to the illustrative embodiment executes power supply control as depicted in FIGS. 4 and 5 in accordance with at a time when the power cord 75 is connected to the AC power supply AC. At this time, after the ASIC 51 executes a necessary initial setting (S21), the ASIC 51 confirms that the tower tray low-voltage power supply 72 is stopped (S27) before the main low-voltage power supply 20 is stopped (S33). Therefore, continuous activation of the tower tray low-voltage power supply 72 even when the ASIC 51 is stopped, may be prevented at a time of connecting the power cord 75. Thus, power-saving may be achieved.

<Effect 4> In the printer system 100, the MCU 71 and the tower tray low-voltage power supply 72 are connected to each other by the signal line CL5. As the tower tray low-voltage power supply 72 receives a Deep-ON/OFF signal (e.g., a first signal) of the ground voltage Vgd (e.g., low-level) from the MCU 71 via the signal line CL5, the tower tray low-voltage power supply 72 supplies an option drive voltage of 6 V (e.g., a first voltage value) to the sheet supply mechanism 73. As the tower tray low-voltage power supply 72 receives a high-level Deep-ON/OFF signal (e.g., a second signal) from the MCU 71, the tower tray low-voltage power supply 72 supplies an option drive voltage of 24 V (e.g., a second voltage value) to the sheet supply mechanism 73. The signal line CL5 is connected to a ground via the pull-down resistor RD. The ground voltage Vgd is supplied to the signal line CL5. Therefore, when a high-level Deep-ON/OFF signal is not transmitted from the MCU 71, the potential of the signal line CL5 is placed in the ground potential (e.g., 0 V). As the potential of the signal line CL5 becomes the ground potential, the tower tray low-voltage power supply 72 is placed in a state to receive a low-level Deep-ON/OFF signal, and the option drive voltage becomes 6 V. Thus, for example, as the dedicated power cord 7A is removed or pulled off from the connecting portion 74 in the normal mode in which the tower tray low-voltage power supply 72 outputs 24 V, the printer 1 stops and the MCU 71 that receives power supply from the main low-voltage power supply 20 of the printer 1 stops. In this case, as the potential of the signal line CL5 is placed in the ground potential, an option drive voltage output from the tower tray low-voltage power supply 72 may be reduced and power-saving may be achieved.

<Effect 5> The printer 1 has the ready mode (e.g., a normal mode), the print mode (e.g., a normal mode), the sleep mode (e.g., a first sleep mode), the deep sleep mode (e.g., a second sleep mode), and the off mode. The controller 50 detects a reception of a print job in the sleep mode as an operational state change in the printer 1, (S43 in FIG. 7). As a predetermined time has passed without a print job received by the printer 1 in the sleep mode, the controller 50 controls the MCU 71 to execute processing for stopping the tower tray low-voltage power supply 72 (S87 in FIG. 8 and S109 and S111 in FIG. 9) and the controller 50 shifts the printer 1 to the deep sleep mode (S93). Thus, as the printer 1 shifts to the deep sleep mode in which more power may be saved, the tower tray low-voltage power supply 72 stops generating an option drive voltage. Thus, power-saving may be achieved.

While the disclosure has been described in detail referring to the specific embodiment thereof, this is merely an example, and various changes, arrangements and modifications may be applied therein without departing from the spirit and scope of the disclosure.

For example, in the above-described illustrative embodiment, the ASIC 51 is configured to execute processing for stopping the main low-voltage power supply 20 (e.g., S31 and S33 in FIG. 5), on the condition that the ASIC 51 receives a complete command SC from the MCU 71. However, the disclosure is not limited thereto. For example, as a predetermined time has passed since the ASIC 51 transmits a command signal SI1 for stopping the tower tray low-voltage power supply 72, the main low-voltage power supply 20 may be stopped without the confirmation of the ASIC 51 that the tower tray low-voltage power supply 72 is stopped. In this case, the MCU 71 may be configured not to transmit a complete command SC in reply to the ASIC 51.

In the above-described illustrative embodiment, when the power cord 75 is connected to the AC power supply AC and the dedicated power cord 7A is connected to the connecting portion 74 to activate the printer system 100, the tower tray low-voltage power supply 72 is placed from the second low output mode (e.g., an option drive voltage of 6 V) to the first low output mode (e.g., an option drive voltage of 0 V) and then stopped (refer to S13 and S25 in FIG. 4). In another embodiment, the tower tray low-voltage power supply 72 may be maintained in the second low output mode without being stopped, and the main low-voltage power supply 20 may be stopped.

When the printer 1 shifts from the sleep mode to the deep sleep mode, the controller 50 controls the tower tray low-voltage power supply 72 to shift from the normal mode (e.g., an option drive voltage of 24 V) to the first low output mode (e.g., an option drive voltage of 0 V) (refer to S87 in FIG. 8). However, the disclosure is not limited thereto. For example, the tower tray low-voltage power supply 72 may be configured to shift from the normal mode to the second low output mode (e.g. an option drive voltage of 6 V).

The controller 50 may control the tower tray low-voltage power supply 72 to shift from the normal mode to the first low output mode, or from the normal mode to the second low output mode, when the printer 1 shifts from the ready mode to the sleep mode.

The ASIC 51 may be configured not to perform an initial setting when the power cord 75 and the dedicated power cord 7A are connected.

When a user presses the power button SW1 to place the printer 1 into the off mode, the ASIC 51 may perform processes similar to those from S23 in FIG. 4 to S37 in FIG. 5. Thus, when the power button SW1 is turned off, the ASIC 51 may transmit a command signal SI1 for stopping the tower tray low-voltage power supply 72 to the MCU 71, so that the tower tray low-voltage power supply 72 may be stopped before the main low-voltage power supply 20 is stopped.

When a user presses the power button SW1 to place the printer 1 into the off mode, the ASIC 51 may not have to stop the tower tray low-voltage power supply 72.

The pull-down resistor RD for connecting the signal line CL5 to the ground may be omitted.

The printer 1 and the tower tray low-voltage power supply 72 may not have to have modes for power-saving.

The power supply system 7 is configured to execute processing for reducing drive voltage to be supplied to the entire printing unit 2 as an apparatus drive voltage. In another embodiment, the power supply system 7 may be configured to execute processing for reducing drive voltage, for example, independently for the fixing unit 2F.

In an image forming system according to the disclosure, a power supply of an image forming apparatus may be configured to supply a control voltage to an option device via a power supply line. In other words, an option controller of the option device may be configured to operate with power supply from the image forming apparatus. Thus, the option controller may be operated when an apparatus controller of the image forming apparatus is activated. A known option controller may need to be operated at all times to receive a control signal from an apparatus controller. This may cause increase in power consumption. The image forming system according to the disclosure may achieve power-saving because the option controller may be configured to operate in association with startup, e.g., activation, and stop of the apparatus controller.

The apparatus controller of the image forming apparatus may be configured to transmit a command for changing an operation status of an option power supply, to the option controller via a communication line. Changing an operation status or changes in an operation status may include various changes, for example, activation and stop of a power supply device, stop of a portion of functions, and increase and reduction of an output voltage. In the image forming system according to the disclosure, for example, the option power supply may be stopped before an apparatus power supply of the image forming apparatus stops. For example, for an image forming apparatus having a power-saving mode in which the power supply of the image forming apparatus is stopped as a certain condition is satisfied, the power supply of the option device may be stopped in association with a change in an operation status, e.g., mode change, of the image forming apparatus. Therefore, in association with mode shift of the image forming apparatus to the power-saving mode, the option device may be stopped to reduce power consumption. Thus, power consumption of the image forming system may be reduced effectively and reliably.

In the image forming system according to the disclosure, after the apparatus controller detects that an operation status of the option power supply is placed in a desired status, the apparatus controller may execute controls for the apparatus power supply. Thus, in the image forming system according to the disclosure, for example, the option power supply may be reliably stopped before the apparatus power supply of the image forming apparatus stops.

In the image forming system according to the disclosure, the apparatus controller may stop the option power supply at an appropriate timing based on an operation status of the image forming apparatus.

An image forming system of this type, may be configured to execute a necessary initial setting, for example, immediately after an apparatus controller is activated as a power cord is connected to a commercial power supply (e.g., an external power supply). In the image forming system as structured above, as an apparatus power supply is stopped without any control performed for an option controller after an initial setting is executed, an option power supply may be kept turned on. Consequently, the option power supply may continue to supply an option drive voltage, which may be supplied to a drive load at a normal time. In other words, as the power cord is plugged in, the option power supply may be activated and power may be wastefully consumed. In the image forming apparatus according to the disclosure, after an initial setting is executed, the apparatus controller may confirm an operation status of the option power supply, e.g., stop of the option power supply, before the apparatus power supply is stopped. Thereafter, the apparatus controller may stop the apparatus power supply. Thus, such a situation may be prevented or reduced that the option power supply may be continuously activated as the power cord is connected, even when the apparatus controller or the apparatus power supply is stopped. Accordingly, power-saving may be achieved.

The apparatus controller may start processing for changing an operation status of the option power supply in connection with a timing in which a power switch is turned off and the image forming system is turned off. Accordingly, for example, as the apparatus controller is stopped after the option power supply is stopped, power of the image forming apparatus and the option device may be saved reliably in connection with an operation of turning the power switch off.

In the image forming system according to the disclosure, the option controller of the option device may be configured to operate with power supply from the image forming apparatus. Thus, the option controller may operate in connection with the activation and stop of the apparatus controller, and power-saving may be achieved. As the option power supply receives a first signal of a ground voltage from the option controller via a signal line, the option power supply may output an option drive voltage of a first voltage value. As the option power supply receives a second signal having a voltage value greater than that of the ground voltage (e.g., a first signal), the option power supply may output an option drive voltage of a second voltage value, which is greater than the first voltage value. For example, the first voltage value may be a voltage value of an option drive voltage to be supplied in a power-saving mode. The second voltage value may be a voltage value of an option drive voltage to be supplied in a normal mode in which printing may be performed by an image forming unit. In such configuration, when the option controller is stopped for some reasons in a state in which the option power supply outputs a voltage of the second voltage value, the option power supply may not be able to change a value of an option drive voltage from the second voltage value to the first voltage value. Accordingly, power-saving may not be achieved. The option controller may stop as supply of a control voltage from a power supply of the image forming apparatus to the option controller is stopped. The option controller may stop, for example, when a power cord of the image forming apparatus is pulled off, or the image forming apparatus and the option device are not properly connected, or after the apparatus controller executes an initial setting immediately after the power cord is plugged in. In the option device according to the disclosure, the signal line connecting the option controller and the option power supply may be connected to a ground via a pull-down resistor. Therefore, when the option controller stops and a first signal or a second signal is not output, a voltage value of the signal line may be a ground voltage. Accordingly, the ground voltage, e.g., a first signal, may be input to the option power supply via the signal line, so that an option drive voltage of the first voltage value may be supplied to a drive load. Therefore, even when the option controller is stopped for some reason, power-saving may be achieved by reducing a voltage value of an option drive voltage output from the option power supply.

In the image forming system according to the disclosure, the image forming apparatus may has a normal mode, a first sleep mode in which power-saving may be achieved, and a second sleep mode in which power-saving may further be achieved. In response to non-detection by the apparatus controller of a change in an operation status of the image forming apparatus, e.g., a user's operation onto a control panel and reception of a print job via a network, for a predetermined period of time, the image forming apparatus may shift to the first sleep mode and then to the second sleep mode. Thus, power-saving may be achieved. In connection with a shift of the image forming apparatus to the second sleep mode as the apparatus controller does not detect any status change for a predetermined period of time in the first sleep mode, the apparatus controller may control the option controller to transmit a first signal to the option power supply. Thus, the option power supply may reduce an option drive voltage, in connection with a shift of the image forming apparatus to the second sleep mode in which power-saving may further be achieved. Thus, power-saving may be achieved.

What is claimed is:

1. An image forming system, comprising:
    an image forming apparatus, comprising:
        an image forming unit;
        a housing configured to store the image forming unit;
        an apparatus controller disposed inside the housing and configured to control the image forming unit;
        an apparatus power supply disposed inside the housing and configured to generate a control voltage that is supplied to the apparatus controller and an apparatus drive voltage that is supplied to the image forming unit, the apparatus power supply including an output terminal from which the control voltage is outputted;
        a first connection terminal exposed external to the housing and electrically connected to the output terminal of the apparatus power supply; and
        a second connection terminal exposed external to the housing and electrically connected to the apparatus controller, and
    an option device connected to the image forming apparatus via the first connection terminal and the second connection terminal, the option device including a sheet supply tray, a sheet supply mechanism, an option power supply, and an option controller, the option device being configured to supply a sheet from the sheet supply tray to the image forming apparatus;
    wherein the apparatus controller is configured to:
        transmit a change command to the option device via the second connection terminal;
        receive information from the option device in response to the change command via the second connection terminal; and
        change an operation status of the apparatus power supply after the apparatus controller receives information in response to the change command.

2. The image forming system of claim 1, wherein the apparatus controller is configured to change the operation status of the apparatus power supply in response to receiving the information via the second connection terminal, wherein the information represents an operation status of an option power supply.

3. The image forming system according to claim 1, wherein the apparatus controller is configured to transmit the change command to stop an operation of an option power supply, to an option controller.

4. The image forming system of claim 1, wherein the housing includes an outer peripheral wall, wherein the first connection terminal and the second connection terminal are disposed along a portion of the outer peripheral wall.

5. The image forming system of claim 1, wherein the apparatus controller is configured to change the operation status of the apparatus power supply from a normal mode to a power saving mode.

6. The image forming system of claim 1, wherein the option device is disposed outside the housing.

7. The image forming system of claim 1, wherein
    the option power supply is configured to generate an option drive voltage that is supplied to the sheet supply mechanism; and
    the option controller is configured to control the option power supply and receive the control voltage supplied from the apparatus power supply, via the first connection terminal.

8. The image forming system of claim 7, wherein the option controller is communicatively connected to the apparatus controller via the second connection terminal, the option controller configured to receive the change command.

9. The image forming system of claim 7, wherein the option controller is electrically connected to the apparatus power supply via the first connection terminal.

10. The image forming system according to claim 1, further comprising:
    a power cord configured to connect to an external power supply and electrically connected to the apparatus power supply; and
    wherein the apparatus controller is configured to execute an initial setting for the apparatus controller as the power cord is connected to the external power supply, and transmit the change command after executing the initial setting.

11. The image forming system according to claim 1, further comprising:
a power switch communicatively connected to the apparatus controller; and
wherein the apparatus controller is configured to, in response to actuation of the power switch:
change the operation status of the apparatus power supply; and
transmit the change command.

12. An image forming system, comprising:
an image forming apparatus;
an option device;
a power supply line configured to connect the image forming apparatus and the option device; and
a communication line configured to connect the image forming apparatus and the option device;
wherein the image forming apparatus includes:
an apparatus controller configured to control the image forming apparatus;
an image forming unit; and
an apparatus power supply configured to generate a control voltage that is supplied to the apparatus controller and an apparatus drive voltage that is supplied to the image forming unit; and
wherein the option device includes:
a drive load;
an option power supply configured to generate an option drive voltage that is supplied to the drive load;
an option controller configured to control the option power supply and receive the control voltage supplied from the apparatus power supply, via the power supply line;
a signal line electrically connecting the option controller and the option power supply; and
a pull-down resistor electrically connected between the signal line and a ground supplying a ground voltage;
wherein the option power supply is configured to:
supply the option drive voltage of a first voltage value to the drive load, in response to receiving a first signal having a voltage value of the ground voltage from the option controller via the signal line; and
supply the option drive voltage of a second voltage value, which is greater than the first voltage value, to the drive load, in response to receiving a second signal having a voltage value higher than the ground voltage from the option controller via the signal line.

13. The image forming system according to claim 12, wherein the image forming apparatus includes a normal mode, a first sleep mode in which power consumption is lower than in the normal mode, and a second sleep mode in which power consumption is lower than in the first sleep mode,
wherein the apparatus controller is configured to:
determine whether an operation status of the image forming apparatus is changed in the first sleep mode;
control the option controller to transmit the first signal to the option power supply, in response to determining the operation status of the image forming apparatus has not changed in the first sleep mode for a predetermined period of time; and
place the image forming apparatus in the second sleep mode.

14. The image forming system of claim 12, wherein the apparatus controller is configured to transmit a change command for changing an operation status of the option power supply to the option controller via the communication line.

* * * * *